(12) United States Patent  
Thakur

(10) Patent No.: US 7,388,690 B2  
(45) Date of Patent: Jun. 17, 2008

(54) METHOD FOR CALIBRATING AN IMAGING APPARATUS CONFIGURED FOR SCANNING A DOCUMENT

(76) Inventor: Khageshwar Thakur, 448 Hollow Creek Rd., Apt#C-9, Lexington, KY (US) 40511

(*) Notice: Subject to any disclaimer, the term of this patent is extended or adjusted under 35 U.S.C. 154(b) by 593 days.

(21) Appl. No.: 11/156,936

(22) Filed: Jun. 20, 2005

(65) Prior Publication Data

US 2006/0268353 A1  Nov. 30, 2006

Related U.S. Application Data

(63) Continuation-in-part of application No. 11/139,712, filed on May 27, 2005.

(51) Int. Cl.
  *H04N 1/00* (2006.01)
  *H04N 1/46* (2006.01)
  *G01N 23/04* (2006.01)
  *G03B 3/00* (2006.01)

(52) U.S. Cl. ............ 358/406; 358/504; 358/509; 250/584; 396/98

(58) Field of Classification Search ........ 358/406, 358/504; 250/584
  See application file for complete search history.

(56) References Cited

U.S. PATENT DOCUMENTS

| 5,900,950 | A | 5/1999 | Hsu |
| 6,534,761 | B2 | 3/2003 | Fukatsu et al. |
| 6,535,649 | B1 | 3/2003 | Chiu |
| 6,674,899 | B2 | 1/2004 | Nagarajan et al. |
| 6,734,995 | B2 | 5/2004 | Chang |
| 6,734,996 | B1 | 5/2004 | Lee |
| 6,941,013 | B1* | 9/2005 | Drayer ............ 382/168 |
| 7,120,297 | B2* | 10/2006 | Simard et al. ...... 382/166 |
| 2001/0031142 | A1* | 10/2001 | Whiteside ........ 396/61 |
| 2003/0063191 | A1* | 4/2003 | Challapali et al. ..... 348/135 |
| 2004/0080623 | A1* | 4/2004 | Cleveland et al. ..... 348/208.1 |
| 2004/0201699 | A1* | 10/2004 | Parulski et al. ..... 348/207.99 |

* cited by examiner

Primary Examiner—Vu Le
Assistant Examiner—Mesfin Getaneh
(74) Attorney, Agent, or Firm—Taylor & Aust, P.C.

(57) ABSTRACT

A method for calibrating an imaging apparatus configured for scanning a document, the imaging apparatus including a scanner head having an illuminant and a sensor, and a phosphorescent material forming a phosphorescent area located opposite the scanner head, the method including at least one of performing an ambient light calibration based on a background light emission intensity level of the phosphorescent area; performing an ambient light time calibration based on a decay constant of the phosphorescent material; performing a horizontal calibration to compensate for irregularities in at least one of the illuminant and the sensor across a width of the phosphorescent area; and performing a vertical calibration to compensate for changes of scanning speed of the scanner head in a lengthwise scanning direction along a length of the phosphorescent area.

39 Claims, 12 Drawing Sheets

METHOD FOR CALIBRATING AN IMAGING APPARATUS CONFIGURED FOR SCANNING A DOCUMENT

This is a continuation-in-part of U.S. patent application Ser. No. 11/139,712 filed May 27, 2005, and entitled, "IMAGING APPARATUS CONFIGURED FOR SCANNING A DOCUMENT."

BACKGROUND OF THE INVENTION

1. Field of the Invention

The present invention relates to an imaging apparatus, and, more particularly, to a method for calibrating an imaging apparatus for scanning a document.

2. Description of the Related Art

An imaging apparatus in the form of a scanner is used to generate a digital representation of a document being scanned. Such a document may include any of a variety of media types, such as paper, card stock, etc., and may be regular (e.g., rectangular) or irregular in shape, and on which there is formed, for example, text, graphics or a picture, e.g., a photo, or a combination thereof. Typically, a color scanner generates three channels of data, e.g., red, green and blue (RGB), in generating a scanned image of the document. Separation of a background associated with a backing surface of the scanner from a foreground, i.e., the scanned image, associated with the document has been a significant problem that those practicing in the imaging art continue to address.

Distinguishing between background and foreground is particularly problematic when the background and the foreground both have the same color, such as white. For example, this problem routinely arises when the image of a white document is placed in front of a white background. More specifically, when a target document, such as business card, having a white perimetrical region is scanned against a white document pad, it may be difficult to distinguish the boundaries of the business card from the background formed by the white document pad. Knowing the boundaries of the scanned document is useful because that increases the accuracy of skew correction. Knowing the boundaries of the scanned document also enables the accurate placement of the contents of the document with respect to a printed output.

Most current scanners come with some type of skew correction and content placement software. However, such scanners use the content of the scanned image as a guide, and sometimes such content-based guidance can be misleading. For example, in a cropped image, when some of the elements are lost with respect to the background, the skew correction becomes faulty. Using a colored document pad, e.g., other than white, does not solve the problem, but only shifts the problem in the color spectrum, since this solution will fail when the scanned image includes a perimetrical color that is the same as the color of the background.

SUMMARY OF THE INVENTION

The invention, in form thereof, is directed to a method for calibrating an imaging apparatus configured for scanning a document. The imaging apparatus includes a scanner head having an illuminant and a sensor for collecting image data, and a phosphorescent material forming a phosphorescent area located opposite the scanner head. The document is positioned between the scanner head and the phosphorescent area during a scanning operation. The method includes at least one of performing an ambient light calibration based on a background light emission intensity level of the phosphorescent area; performing an ambient light time calibration based on a decay constant of the phosphorescent material; performing a horizontal calibration to compensate for irregularities in at least one of the illuminant and the sensor across a width of the phosphorescent area; and performing a vertical calibration to compensate for changes of scanning speed of the scanner head in a lengthwise scanning direction along a length of the phosphorescent area.

The invention, in another form thereof, is directed to a method for performing an ambient light calibration of an imaging apparatus configured for scanning a document. The imaging apparatus includes a scanner head having an illuminant and a sensor for collecting image data, and a phosphorescent material forming a phosphorescent area located opposite the scanner head. The document is positioned between the scanner head and the phosphorescent area during a scanning operation. The method includes building a histogram of intensity levels of light emission of the phosphorescent area; and generating a threshold from the histogram of intensity levels of light emission of the phosphorescent area that is used to differentiate between a background associated with a non-attenuated portion of the phosphorescent area and a foreground associated with an attenuated portion of the phosphorescent area.

The invention, in another form thereof, is directed to a method for performing an ambient light time calibration of an imaging apparatus configured for scanning a document. The imaging apparatus includes a scanner head having an illuminant and a sensor for collecting image data, and a phosphorescent material forming a phosphorescent area located opposite the scanner head. The document is positioned between the scanner head and the phosphorescent area during a scanning operation. The method includes acquiring a decay constant of the phosphorescent material forming the phosphorescent area; and generating compensation data using the decay constant to correct dark image data collected by the sensor, the dark image data relating to light emitted by the phosphorescent material at various locations on the phosphorescent area.

The invention, in another form thereof, is directed to a method for performing a horizontal calibration of an imaging apparatus configured for scanning a document. The imaging apparatus includes a scanner head having an illuminant and a sensor for collecting image data, and a phosphorescent material forming a phosphorescent area located opposite the scanner head. The document is positioned between the scanner head and the phosphorescent area during a scanning operation. The method includes collecting intensity level readings from a horizontal strip of the phosphorescent material arranged along a width of the phosphorescent area; and generating compensation data to normalize the intensity level readings.

The invention, in another form thereof, is directed to a method for performing a vertical calibration of an imaging apparatus configured for scanning a document. The imaging apparatus includes a scanner head having an illuminant and a sensor for collecting image data, and a phosphorescent material forming a phosphorescent area located opposite the scanner head. The document is positioned between the scanner head and the phosphorescent area during a scanning operation. The method includes collecting intensity level readings from a vertical strip of the phosphorescent material arranged in a lengthwise scanning direction along a length of the phosphorescent area; and generating compensation data to normalize the intensity level readings.

The invention, in another form thereof, is directed to an imaging apparatus configured for scanning a document. The imaging apparatus includes a scanner head having an illuminant and a sensor for collecting image data. A phosphorescent area is formed from a phosphorescent material, and located opposite the scanner head, wherein the document is positioned between the scanner head and the phosphorescent area during a scanning operation. A controller is coupled to the scanner head. The controller executes program instruction for performing at least one of an ambient light calibration based on a background light emission intensity level of the phosphorescent area; an ambient light time calibration based on a decay constant of the phosphorescent material; a horizontal calibration to compensate for irregularities in at least one of the illuminant and the sensor across a width of the phosphorescent area; and a vertical calibration to compensate for changes of scanning speed of the scanner head in a lengthwise scanning direction along a length of the phosphorescent area.

The invention, in another form thereof, is directed to an imaging apparatus configured for scanning a document. The imaging apparatus includes a scanner head having an illuminant and a sensor for collecting image data. A phosphorescent area is formed from a phosphorescent material, and located opposite the scanner head, wherein the document is positioned between the scanner head and the phosphorescent area during a scanning operation. A controller is coupled to the scanner head. The controller executes program instructions for performing an ambient light calibration of the imaging apparatus, including building a histogram of intensity levels of light emission of the phosphorescent area; and generating a threshold from the histogram of intensity levels of light emission of the phosphorescent area that is used to differentiate between a background associated with a non-attenuated portion of the phosphorescent area and a foreground associated with an attenuated portion of the phosphorescent area.

The invention, in another form thereof, is directed to an imaging apparatus configured for scanning a document. The imaging apparatus includes a scanner head having an illuminant and a sensor for collecting image data. A main phosphorescent area portion is formed from a phosphorescent material, and located opposite the scanner head, wherein the document is positioned between the scanner head and the main phosphorescent area portion during a scanning operation. A supplemental phosphorescent area portion is formed from phosphorescent material, and positioned outside the boundaries of the main phosphorescent area portion.

The invention, in another form thereof, is directed to an imaging apparatus configured for scanning a document. The imaging apparatus includes a scanner head having an illuminant and a sensor for collecting image data. A phosphorescent area is formed from a phosphorescent material, and located opposite the scanner head, wherein the document is positioned between the scanner head and the phosphorescent area during a scanning operation. A horizontal strip formed from phosphorescent material is arranged along a width of the phosphorescent area.

The invention, in another form thereof, is directed to an imaging apparatus configured for scanning a document. The imaging apparatus includes a scanner head having an illuminant and a sensor for collecting image data. A phosphorescent area is formed from a phosphorescent material, and located opposite the scanner head, wherein the document is positioned between the scanner head and the phosphorescent area during a scanning operation. A vertical strip formed from phosphorescent material is arranged in a lengthwise scanning direction along a length of the phosphorescent area.

One advantage of the present invention is the ability to find a border of the document being scanned by sensing light emission from the phosphorescent material, and this may be achieved without using image data, e.g., RGB data, representing the contents of the scanned document, so as to separate the foreground, i.e., document, from the background.

Another advantage is that since it is very unlikely to scan a phosphorescent paper during a scanning operation, a phosphorescent document pad is unlikely to fail with respect to a document border determination.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
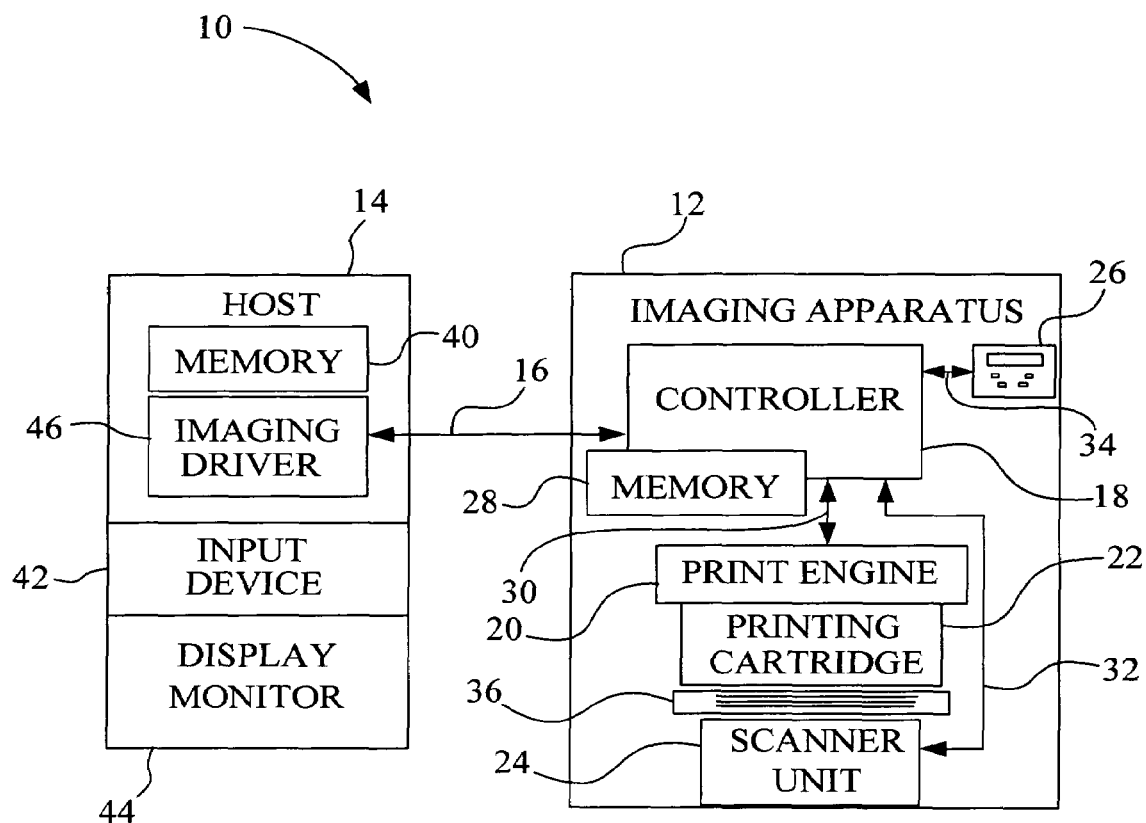
FIG. 1 is a diagrammatic depiction of an imaging system embodying the present invention.

Referring now to the drawings and particularly to FIG. 1, there is shown a diagrammatic depiction of an imaging system 10 embodying the present invention. As shown, imaging system 10 may include an imaging apparatus 12 and a host 14. Imaging apparatus 12 communicates with host 14 via a communications link 16. As used herein, the term "communications link" is used to generally refer to structure that facilitates electronic communication between multiple components, and may operate using wired or wireless technology.

Imaging apparatus 12 may be, for example, an ink jet printer and/or copier; an electrophotographic printer and/or copier; a thermal transfer printer and/or copier; an all-in-one (AIO) unit that includes a print engine, a scanner unit, and possibly a fax unit; or may be simply just a scanner unit. An AIO unit is also known in the art as a multifunction machine. In the embodiment shown in FIG. 1, however, imaging apparatus 12 is shown as a multifunction machine that includes a controller 18, a print engine 20, a printing cartridge 22, a scanner unit 24, and a user interface 26. Imaging apparatus 12 may communicate with host 14 via a standard communication protocol, such as for example, universal serial bus (USB), Ethernet or IEEE 812.1x.

Controller 18 includes a processor unit and associated memory 28, and may be formed as one or more Application Specific Integrated Circuits (ASIC). Memory 28 may be, for example, random access memory (RAM), read only memory (ROM), and/or non-volatile RAM (NVRAM). Alternatively, memory 28 may be in the form of a separate electronic memory (e.g., RAM, ROM, and/or NVRAM), a hard drive, a CD or DVD drive, or any memory device convenient for use with controller 18. Controller 18 may be a printer controller, a scanner controller, or may be a combined printer and scanner controller. In the present embodiment, controller 18 communicates with print engine 20 via a communications link 30. Controller 18 communicates with scanner unit 24 via a communications link 32. User interface 26 is communicatively coupled to controller 18 via a communications link 34. Controller 18 serves to process print data and to operate print engine 20 during printing, as well as to operate scanner unit 24 and process data obtained via scanner unit 24.

In the context of the examples for imaging apparatus 12 given above, print engine 20 can be, for example, an ink jet print engine, an electrophotographic print engine or a thermal transfer engine, configured for forming an image on a print medium 36, such as a sheet of paper, transparency or fabric. As an ink jet print engine, for example, print engine 20 operates printing cartridge 22 to eject ink droplets onto print medium 36 in order to reproduce text and/or images. As an electrophotographic print engine, for example, print engine 20 causes printing cartridge 22 to deposit toner onto print medium 36, which is then fused to print medium 36 by a fuser (not shown), in order to reproduce text and/or images.

Host 14, which may be optional, may be, for example, a personal computer, including memory 40, such as RAM, ROM, and/or NVRAM, an input device 42, such as a keyboard, and a display monitor 44. Host 14 further includes a processor, input/output (I/O) interfaces, and at least one mass data storage device, such as a hard drive, a CD-ROM and/or a DVD unit.

Host 14 includes in its memory a software program including program instructions that function as an imaging driver 46, e.g., printer/scanner driver software, for imaging apparatus 12. Imaging driver 46 is in communication with controller 18 of imaging apparatus 12 via communications link 16. Imaging driver 46 facilitates communication between imaging apparatus 12 and host 14, and may provide formatted print data to imaging apparatus 12, and more particularly, to print engine 20, to print an image.

In some circumstances, it may be desirable to operate imaging apparatus 12 in a standalone mode. In the standalone mode, imaging apparatus 12 is capable of functioning without host 14. Accordingly, all or a portion of imaging driver 46, or a similar driver, may be located in controller 18 of imaging apparatus 12 so as to accommodate printing during a copying or facsimile job being handled by imaging apparatus 12 when operating in the standalone mode.

Scanner unit 24 may be of a conventional scanner type, such as for example, a sheet feed or flat bed scanner. In the context of the present invention, in some embodiments either scanner type may be used. As is known in the art, a sheet feed scanner transports a document to be scanned past a stationary sensor device.

Figure 2:
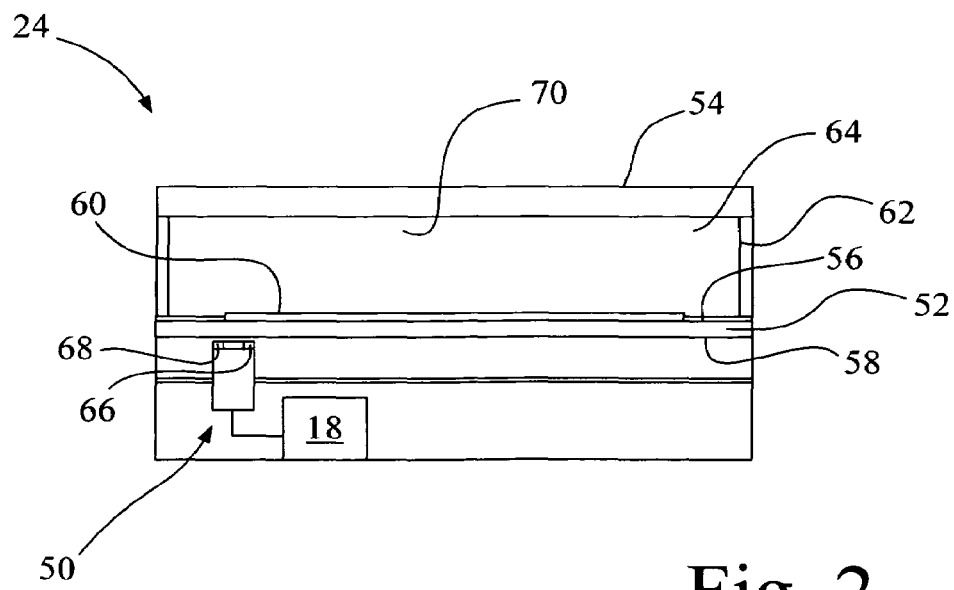
FIG. 2 is a diagrammatic representation of an embodiment of the scanner unit used in the imaging system of FIG. 1.

Referring to FIG. 2, there is shown an embodiment of the present invention where scanner unit 24 is a flat bed scanner. Scanner unit 24 includes a scanner head 50 (e.g., a scan bar), a document glass 52 and a scanner lid 54. Document glass 52 has a first side 56 that faces scanner lid 54, and a second side 58 that faces away from scanner lid 54. First side 56 of document glass 52 provides support for a document 60 during a scanning operation.

FIG. 2 shows scanner unit 24 with scanner lid 54 in an open position. Scanner lid 54 may be moved from the open position, as shown in FIG. 2, to a closed position that covers document glass 52. Affixed to scanner lid 54 is a document pad 62. Document pad 62 has a surface 64 that forms a background for document 60 being scanned. Scanner head 50 includes an illuminant 66, e.g., one or more lamps, LED arrays, etc., and a sensor 68, e.g., one or more reflectance sensor arrangements, that are scanned across the document 60 to collect image data relating to document 60. Each of illuminant 66 and sensor 68 is positioned to face second side 58, e.g., the under side, of document glass 52. Each of illuminant 66 and sensor 68 is communicatively coupled to controller 18.

In accordance with the present invention, surface 64 of document pad 62 is made of a phosphorescent material that forms a phosphorescent area 70 located opposite sensor 68. The phosphorescent material may be obtained, for example, from United Minerals and Chemical Corporation (UMC) of Lyndhurst, N.J. The phosphorescent material is charged, i.e., absorbs light, when exposed to a light source, and discharges, i.e., emits, light after being charged. In one embodiment, for example, phosphorescent area 70 is formed by a phosphorescent coating, such as a phosphorescent paint, applied to a substrate, such as a plastic plate forming a portion of document pad 62. Also, it is contemplated that the phosphorescent material may be sprinkled, in a dry or liquid form, on to a holding layer, which may include an adhesive binder. In these examples, therefore, the phosphorescent material may be applied uniformly or non-uniformly in phosphorescent area 70. In addition, the phosphorescent material may be applied in phosphorescent area 70 in a predetermined pattern, such as for example, a grid pattern.

The light source that charges the phosphorescent material may be, for example, illuminant 66, or some other controlled illuminant, providing dedicated or leaked light, or may be ambient light. In order to charge the phosphorescent material using ambient light, scanner lid 54 is place in the open position so that ambient light may reach phosphorescent area 70. Illuminant 66 may be, for example, the same illuminant used to collect RGB data from document 60 via scanner head 50.

Figure 3:
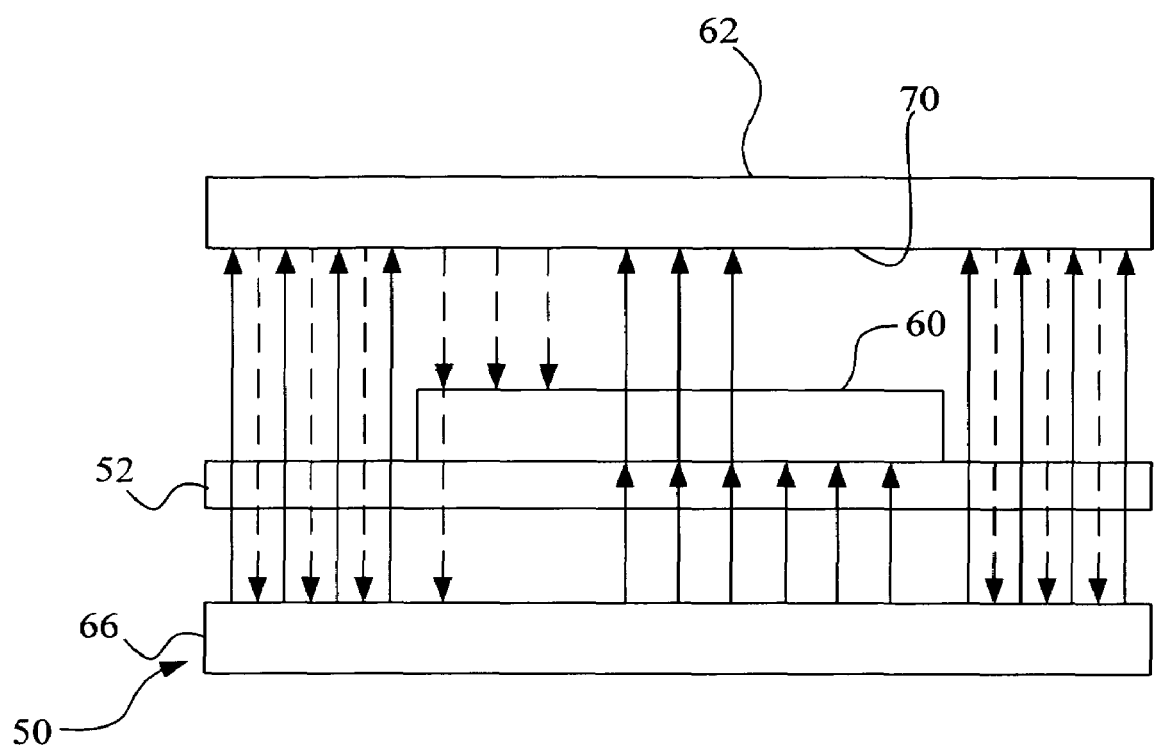
FIG. 3 illustrates light originating from the illuminant of the scanner head, and light emitted by the phosphorescent material of the phosphorescent area of the document pad, of FIG. 2.
Figure 4A:
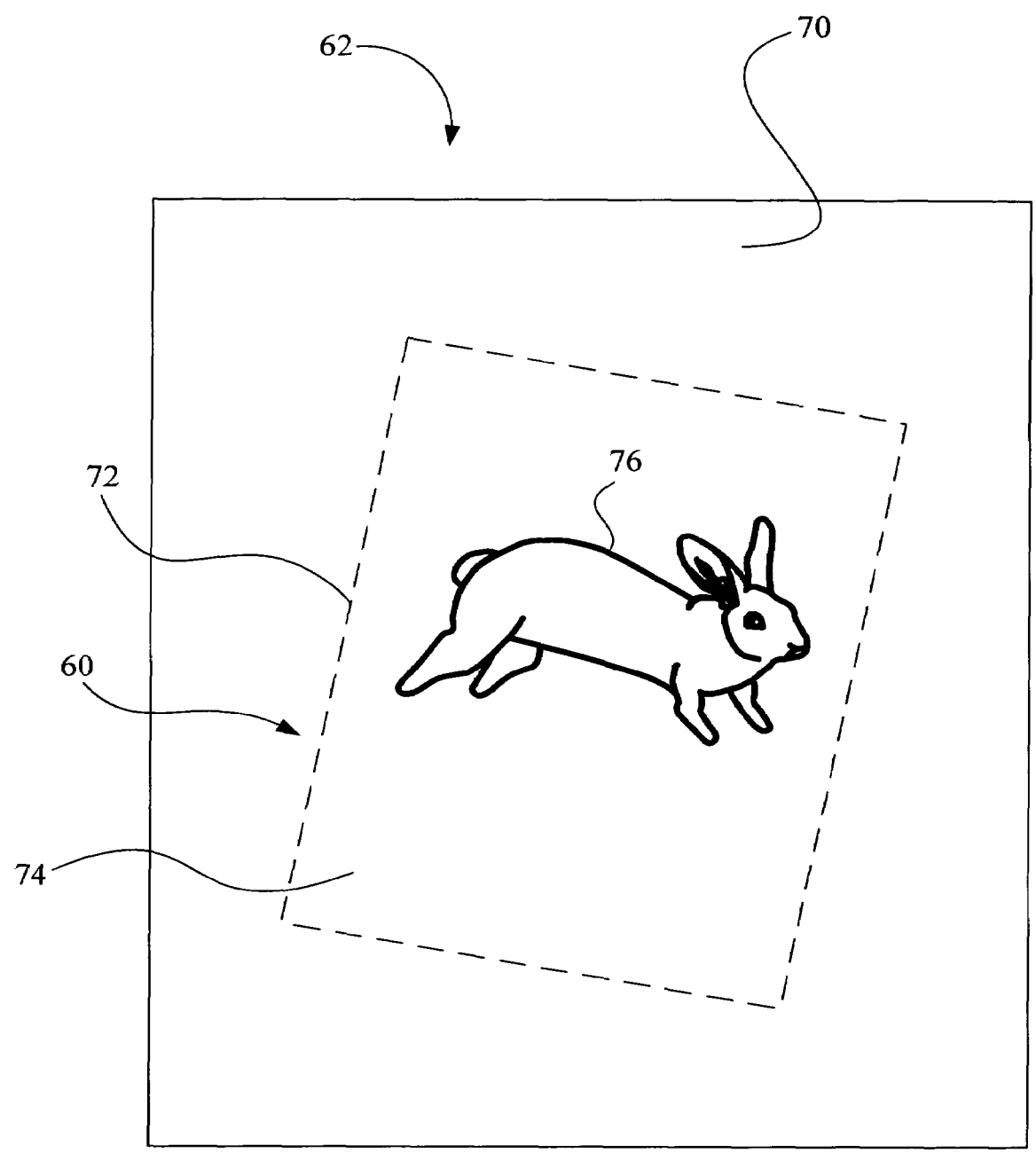
FIG. 4A shows an exemplary document positioned against the background provided by the phosphorescent area of the document pad of FIG. 2.

In the embodiment shown in FIG. 2, the phosphorescent material forming phosphorescent area 70 is positioned to face first side 56 of document glass 52. In the illustration of FIG. 3, light originating from illuminant 66 of scanner head 50 is represented by solid arrowed lines, and light emitted by the phosphorescent material of phosphorescent area 70 of document pad 62 is represented by dashed arrowed lines. FIG. 4A shows document 60 positioned against the background provided by phosphorescent area 70. Document 60 has a border 72, which in this example constitutes the four edges of a rectangular medium 74 on which a picture 76 is formed.

As shown in FIG. 3, when document 60 is positioned between document pad 62 and scanner head 50, light is attenuated during the charge of the phosphorescent material (represented by the shorter solid arrowed lines) and is attenuated during the discharge of the phosphorescent material (represented by the shorter dashed arrowed lines) in the area associated with document 60. Accordingly, and referring to FIG. 4B, during light emission of the phosphorescent material of phosphorescent area 70 in the substantial absence of light from other sources, a dark image 78 of document 60 is formed that may be sensed by sensor 68. Dark image 78 has a high contrast ratio with respect to the background 80 defined by the portion of phosphorescent area 70 that is not attenuated by document 60.

Figure 4B:
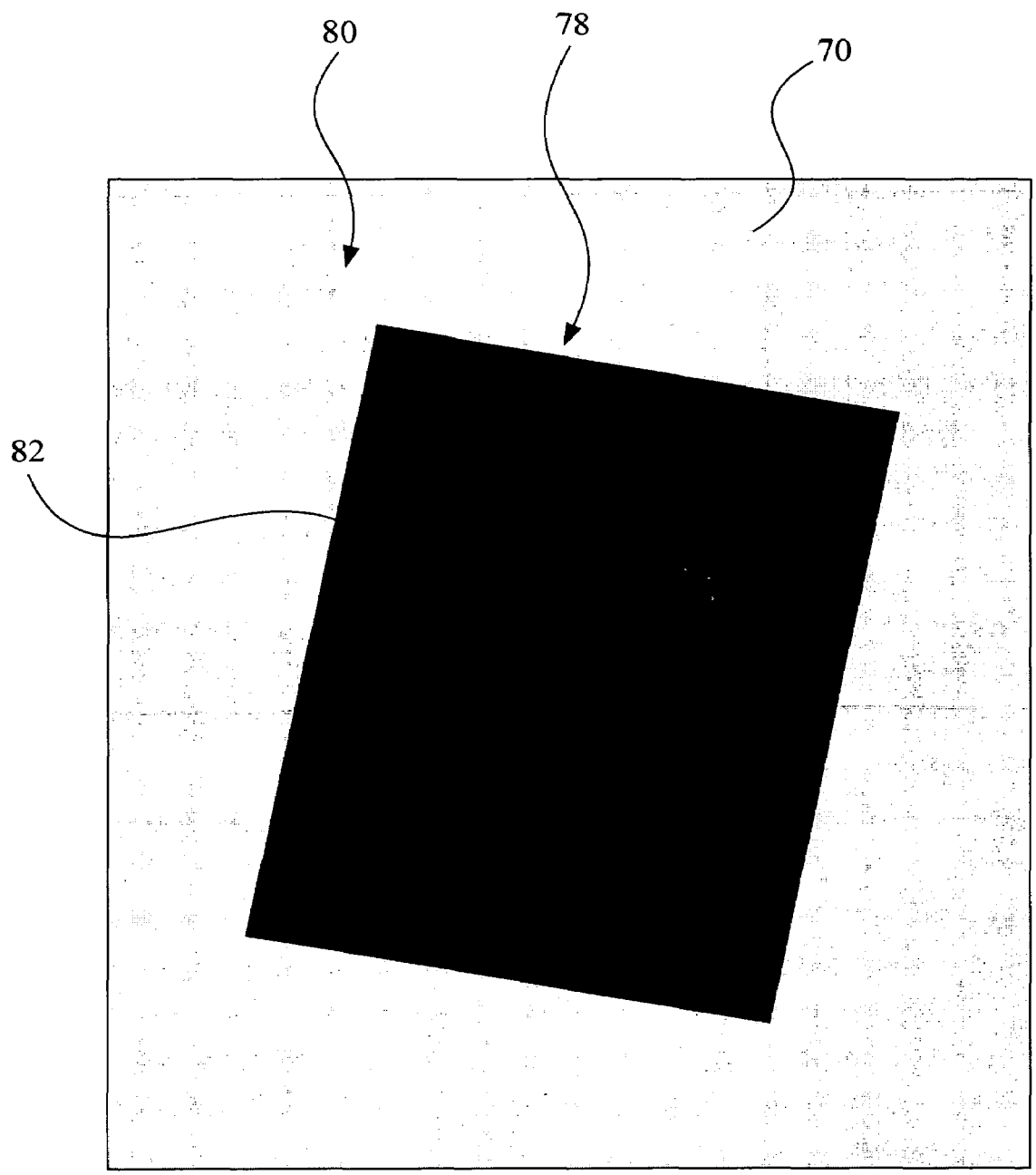
FIG. 4B shows an exemplary representation of a dark image of the document of FIG. 4A generated using the light emitted by the phosphorescent material from the phosphorescent area of the document pad of FIG. 2.

Referring to FIGS. 2 and 3, during one exemplary scanning operation, for example, document 60 is positioned between sensor 68 and phosphorescent area 70. As shown in the embodiment of FIGS. 4A and 4B, phosphorescent area 70 is greater than a surface area of document 60. Controller 18 executes program instructions to control illuminant 66 and to read sensor 68 to collect RGB (three channel) image data associated with document 60, and to collect dark image (fourth channel) data associated with dark image 78 of document 60. However, controller 18 may use only the dark image data relating to a boundary 82 of dark image 78, and not the RGB image data, to determine the border 72 of document 60.

For example, in order to generate the dark image data, sensor 68 provides signals to controller 18 relating to light emitted by the phosphorescent material at various locations on phosphorescent area 70, wherein document 60 is sensed by sensor 68 as dark image 78 in comparison to the background 80 formed by the portion of phosphorescent area 70 not attenuated by document 60 (see FIGS. 2, 3 and 4B).

In some embodiments of the present invention, the dark image data (D) may be generated to be interleaved with regular RGB image data, and this may be achieved in several different ways.

For example, one way is for controller 18 to take one or more dark image readings with sensor 68 after every RGB image reading taken with sensor 68. This may be represented by the sequence: RGB.DDD.RGB.DDD . . . , where D represents a dark image reading and RGB represent the red, green, blue image readings, respectively.

In the event it is determined that taking triple dark image readings after each RGB reading is not necessary in order to build a suitable boundary edge map of boundary 82 of dark image 78, representing the border 72 of document 60, then controller 18 may take multiple RGB readings with sensor 68 before taking each of the triple dark image readings with sensor 68, so that the overall number of dark image readings may be reduced. For example, this sequence may be: RGB.RGB.RGB.DDD.RGB.RGB . . . . As a further reduction, each of the triple dark image readings may be reduced to a double or single dark image reading, exhibited by the sequence: RGB.RGB.RGB.D.RGB.RGB . . . . By reducing the number of dark image readings D, the RGB image resolution is increased.

In embodiments where illuminant 66 is used in collecting RGB image data relating to the content of document 60 and for charging the phosphorescent material at phosphorescent area 70, the phosphorescent material is charged when illuminant 66 is ON, and controller 18 executes program instructions to turn OFF illuminant 66 while light emitted by the phosphorescent material is being sensed by sensor 68.

As another example, where ambient light is used to charge the phosphorescent material, the ambient light is substantially blocked, such as by closing scanner lid 54, while the light emitted by the phosphorescent material is being sensed by sensor 68.

Figure 4C:
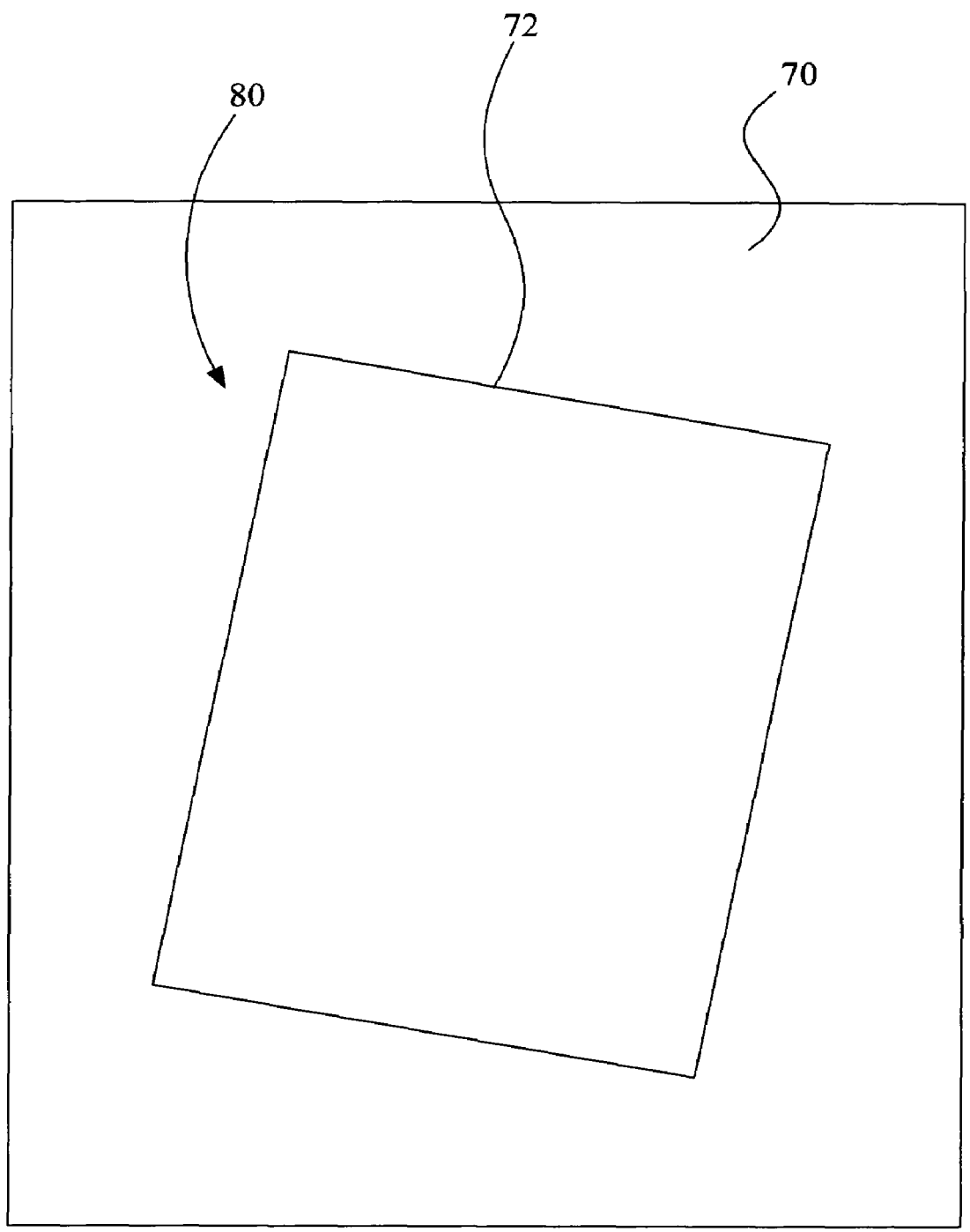
FIG. 4C illustrates the border of the document of FIG. 4A determined in accordance with the present invention.

The dark image data and the RGB image data are processed by controller 18, or in other embodiments by other firmware or software residing in imaging apparatus 12 and/or host 14, which in turn separates the dark image 78 and the background 80 based on the high contrast between the two to determine the boundary 82 of dark image 78. In turn, referring to FIG. 4C, the border 72, i.e., edge coordinates, of document 60 is then extracted from the background 80, thereby relating the position of document 60 with respect to scanner head 50. Once the border 72 of document 60 is determined, controller 18 uses the coordinates associated with border 72 to define and de-skew the RGB image data that corresponds to document 60.

Thereafter, print engine 20 may be used to print the de-skewed RGB image data associated with document 60.

As a further refinement of the present invention, the contrast of dark image 78 with respect to background 80 may be improved by including one or more dedicated light sources that are used to charge the phosphorescent material at phosphorescent area 70 of document pad 62. In all embodiments of the present invention, the light used for charging the phosphorescent material at phosphorescent area 70 of document pad 62 may be, for example, light in the visible light spectrum, including fixed frequency light, such as blue, or may be outside the visible light spectrum, such as ultraviolet light.

Figure 5:
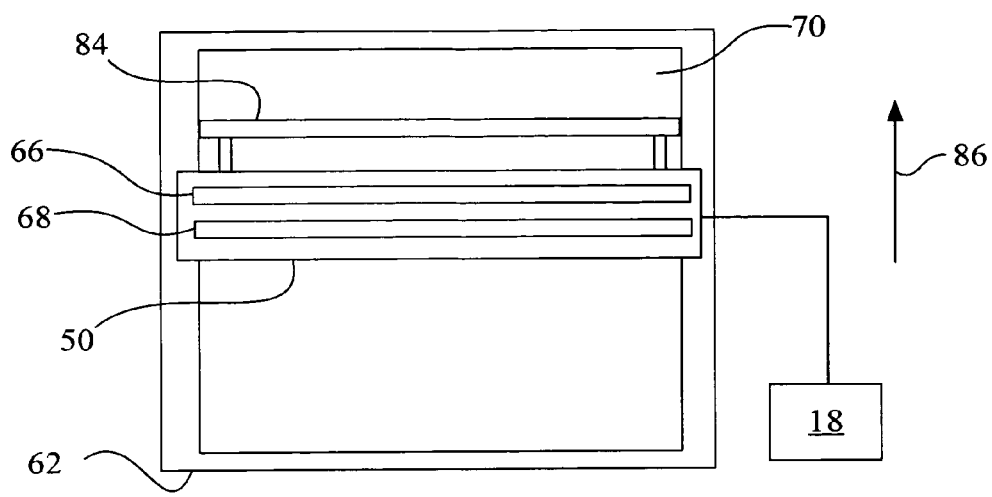
FIG. 5 is a diagrammatic representation of another embodiment of the present invention, wherein a dedicated illuminant is used to charge the phosphorescent material.

In one embodiment, for example, illustrated in FIG. 5, a dedicated illuminant 84, such as a light pipe, may be added to scanner head 50 and positioned upstream of illuminant 66 in scan direction 86. In this example, controller 18 may gate illuminant 84 ON at the beginning, or end, of each scan to charge the phosphorescent material at phosphorescent area 70 of document pad, 62.

In another embodiment, referring again to FIGS. 1 and 2, illuminant 66 may be controlled by controller 18 to increase the intensity of illuminant 66 so that more light is leaked to the phosphorescent material at phosphorescent area 70 of document pad 62. Reflective surfaces, such as white plastic, may be used in the housing for illuminant 66 to increase the amount of light delivered to the phosphorescent material at phosphorescent area 70 of document pad 62.

Figure 6:
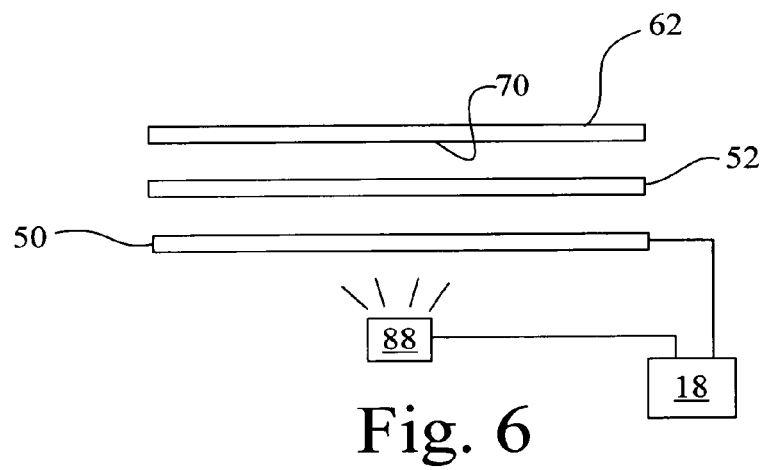
FIG. 6 is a diagrammatic representation of another embodiment of the present invention, wherein a fixed position illuminant used to charge the phosphorescent material is located below the document glass of the scanner unit.

In another embodiment, as illustrated in FIG. 6, a fixed position illuminant 88 may be located inside scanner unit 24, such as for example, below document glass 52. Fixed position illuminant 88 is coupled to controller 18, and turned ON once before every scan, or may be left on during the entire scan, so as to increase the amount of light delivered to the phosphorescent material at phosphorescent area 70 of document pad 62. When illuminant 88 is to be left ON during the entire scan, the frequency of light supplied by illuminant 88 may be selected so that the light does not interfere with the frequency of light supplied by scanner head 50 in collecting RGB image data.

Figure 7:
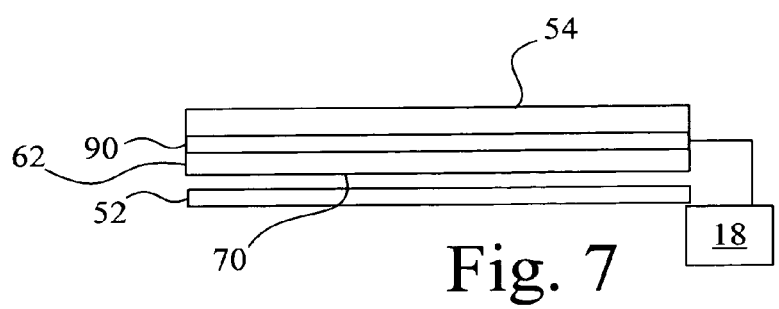
FIG. 7 is a diagrammatic representation of another embodiment of the present invention, wherein a backlighting illuminant is used to charge the phosphorescent material.

In still another embodiment, as illustrated in FIG. 7, the phosphorescent material in phosphorescent area 70 of document pad 62 is charged from behind, such as for example, by positioning a backlighting illuminant 90 between scanner lid 54 and the phosphorescent material at phosphorescent area 70 of document pad 62. The operation of backlighting illuminant 90 is controlled by controller 18.

As described above with respect to FIG. 3, a document 60 positioned between scanner head 50 and phosphorescent area 70 of document pad 62 attenuates light during both charge and discharge of the phosphorescent material, thereby creating a high contrast dark image 78 of document 60, as illustrated in FIGS. 4A and 4B. Although the dual attenuation of light by document 60 produces a large difference in lighting levels, this may not be the only source of differences in lighting levels. Other sources of differences in lighting levels, such as for example, the scan speed of scanner head 50, any irregularities in the illuminant, e.g., illuminant 66, and the presence or absence of ambient light can also produce differences in lighting levels. In order to achieve a high signal-to-noise ratio so as to consistently produce a high contrast dark image, such as the high contrast dark image 78 of document 60, it is desirable to compensate for the systematic errors that arise from the differences in lighting levels at phosphorescent area 70 of document pad 62.

The present invention includes calibration methods and techniques, as more fully described below, that address such systematic errors, and improve the robustness of an imaging apparatus utilizing a document scan area formed with a phosphorescent material, such as phosphorescent area 70 of document pad 62.

Figure 8:
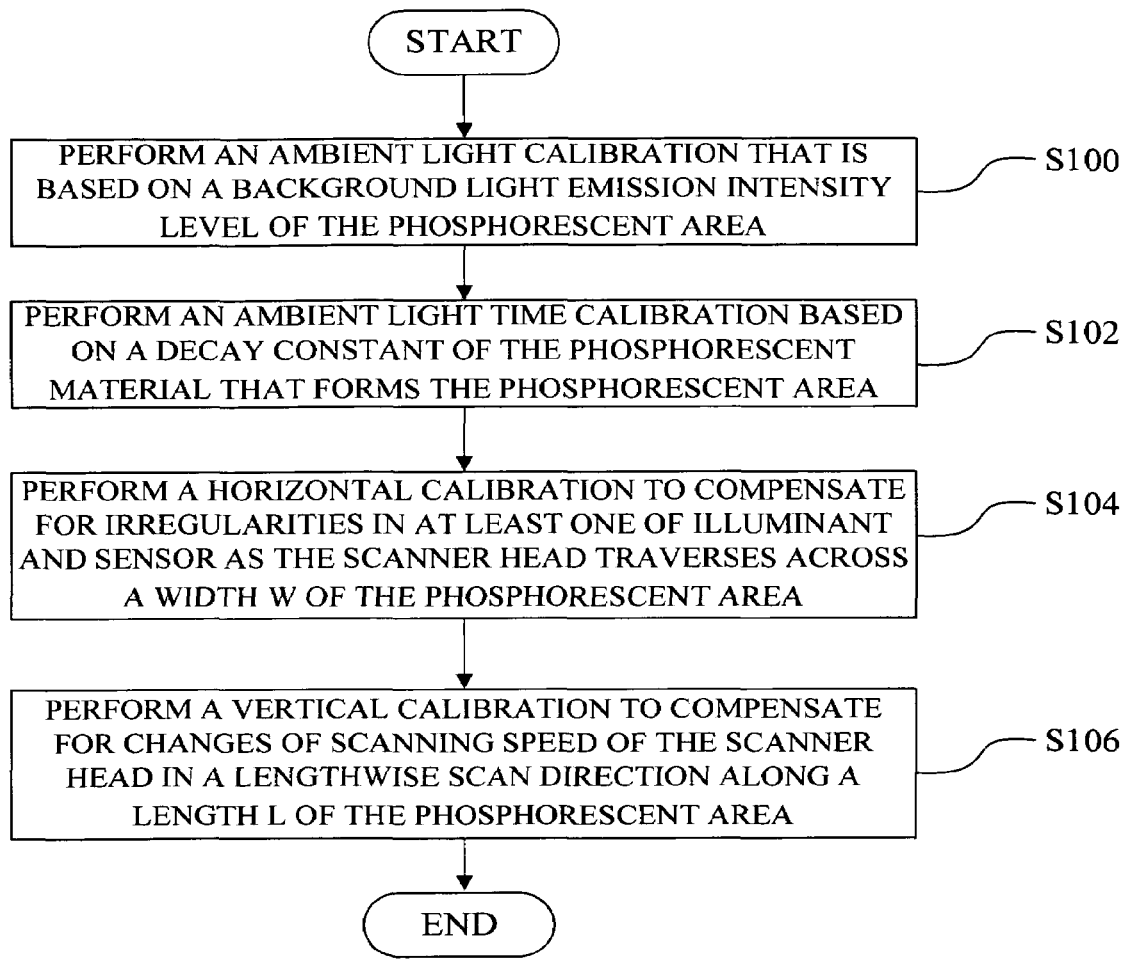
FIG. 8 is a flowchart of a comprehensive method for calibrating an imaging apparatus configured for scanning a document.

FIG. 8 is a flowchart of a comprehensive method for calibrating an imaging apparatus, such as imaging apparatus 12, configured for scanning a document, such as document 60. The method of FIG. 8 may be performed, for example, by program instructions executing on controller 18 of imaging apparatus 12. Imaging apparatus 12 includes scanner head 50 having illuminant 66 and sensor 68 for collecting image data, and a phosphorescent material forming phosphorescent area 70 located opposite scanner head 50, wherein document 60, and/or other documents, may be positioned between scanner head 50 and phosphorescent area 70 during a scanning operation. The method of FIG. 8 includes four calibration techniques, which in some systems may be used collectively. Alternatively, other imaging apparatus may include only one of the calibration techniques, or some subset of the total calibration techniques.

At step S100, an ambient light calibration is performed that is based on a background light emission intensity level of phosphorescent area 70. The ambient light calibration takes into account changes in ambient light levels with respect to phosphorescent area 70 of document pad 62. For example, due to variations in the amount of ambient light to which phosphorescent area 70 is exposed, it is possible that during light emission of phosphorescent area 70 the foreground, e.g., dark image 78, of one image taken at one time may be darker than the background of another image taken at another time. Accordingly, a universal threshold may not adequately separate background from foreground in all instances. In order to provide adequate compensation for this occurrence, a dynamic threshold is generated that may be changed, for example, before or during a scan of scanner head 50, to adequately separate background from foreground in all instances, regardless of changes in ambient light levels.

Figure 9:
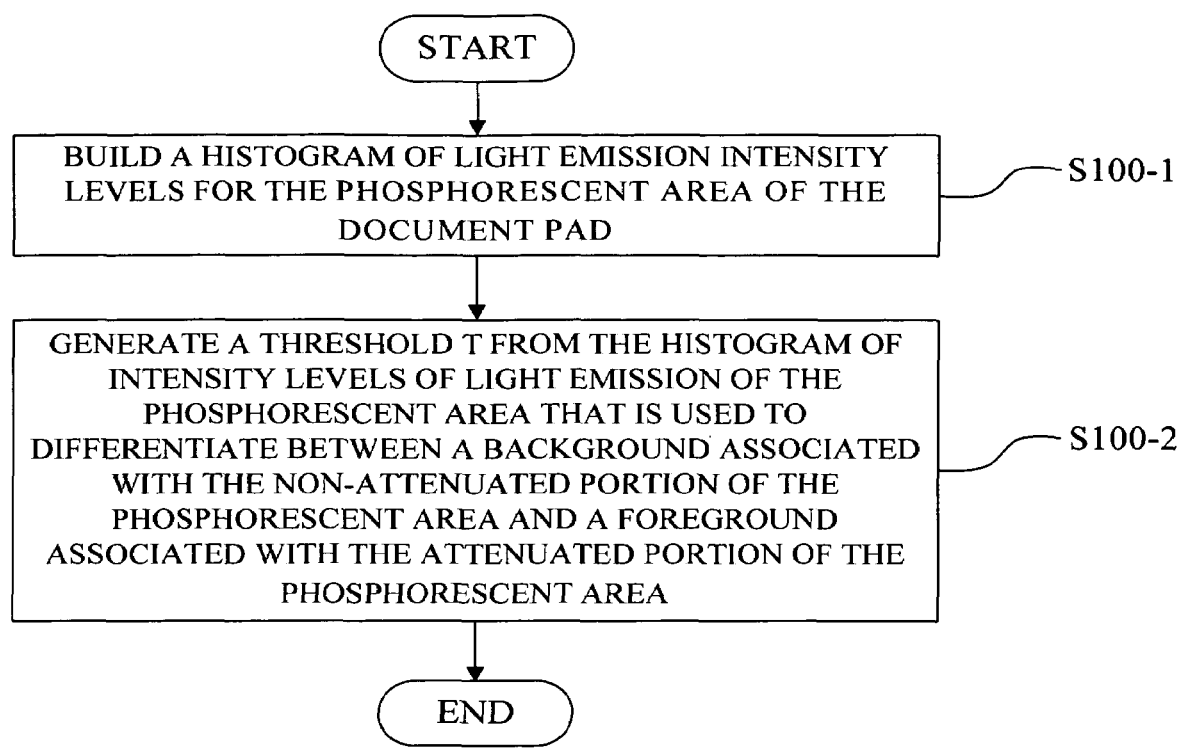
FIG. 9 is a flowchart depicting an ambient light calibration in accordance with one aspect of the present invention.

FIG. 9 is a flowchart depicting an ambient light calibration in accordance with one aspect of the present invention, and is discussed in more detail below following the discussion of the method of FIG. 8.

At step S102, an ambient light time calibration is performed based on a decay constant of the phosphorescent material that forms phosphorescent area 70. The background light intensity level may change with each scan based on variations in ambient light, and accordingly, steps S100 and S102 may be applied with each scan, thereby accounting for both intensity and time contribution of ambient light. The decay constant represents the rate of decay of the intensity of the light emitted from the phosphorescent material.

Figure 10:
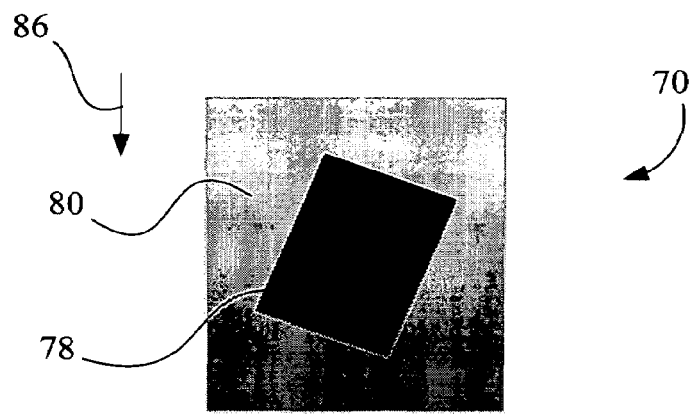
FIG. 10 illustrates the diminishing effect of ambient light as the scan progresses.

The ambient light time calibration takes into account the diminishing effect of ambient light as the scan progresses, and provides compensation therefor. For example, as illustrated in FIG. 10, the light emission, i.e., after-glow, of phosphorescent area 70 resulting from exposure to ambient light may be stronger, i.e., lighter, at the top of the scan, with respect to scan direction 86 and weaker, i.e., darker, at the bottom of scan. After compensation, background 80 will be sensed by sensor 68 as if the background has a consistent illumination intensity.

Figure 11:
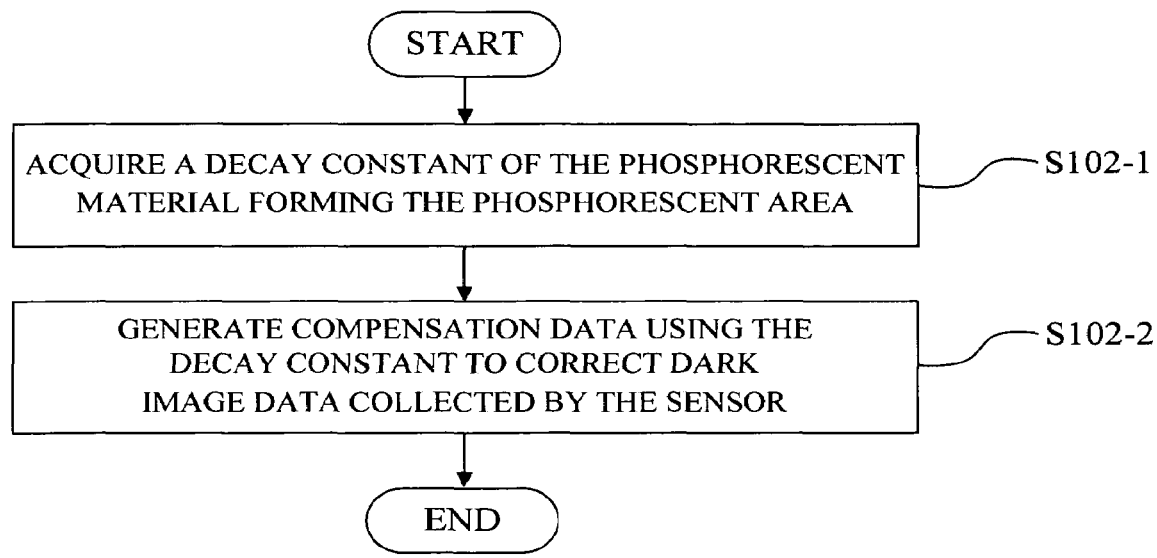
FIG. 11 is a flowchart depicting an ambient light time calibration process in accordance with one aspect of the present invention.

FIG. 11 is a flowchart depicting an ambient light time calibration process in accordance with one aspect of the present invention, and is discussed in more detail below following the discussion of the method of FIG. 8.

At step S104, a horizontal calibration is performed to compensate for irregularities in at least one of illuminant 66 and sensor 68 as scanner head 50 traverses across a width W of phosphorescent area 70.

Figure 12:
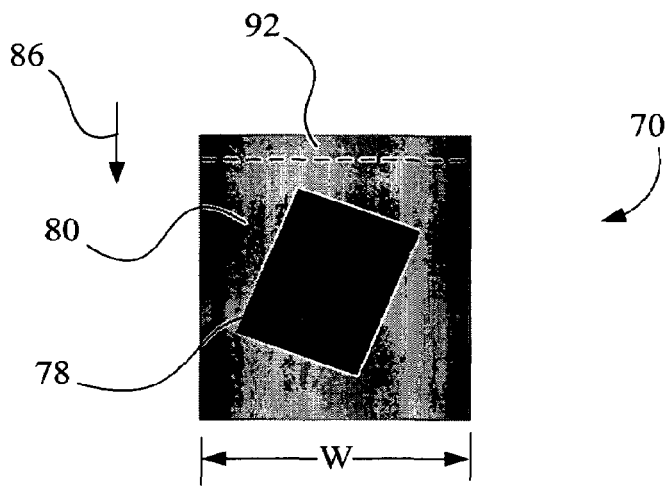
FIG. 12 is a diagrammatic depiction of a phosphorescent area including a horizontal calibration strip.

FIG. 12 is a diagrammatic depiction of phosphorescent area 70 including a horizontal calibration strip 92 formed from phosphorescent material that is used in performing the horizontal calibration. Phosphorescent strip 92 may be located at the top or the bottom of phosphorescent area 70. Alternatively, horizontal calibration strip 92 may be provided separate from phosphorescent area 70. For example, illuminant 66, such as a light pipe, may not distribute the light perfectly uniform across the width W of phosphorescent area 70 due to irregularities in illuminant 66. Further, it is unlikely that sensor 68 will generate the same level of output for same level of input light across the width W of phosphorescent area 70. In order to compensate for these irregularities so as to obtain a uniform output, the horizontal calibration may be performed before each scan.

Figure 13:
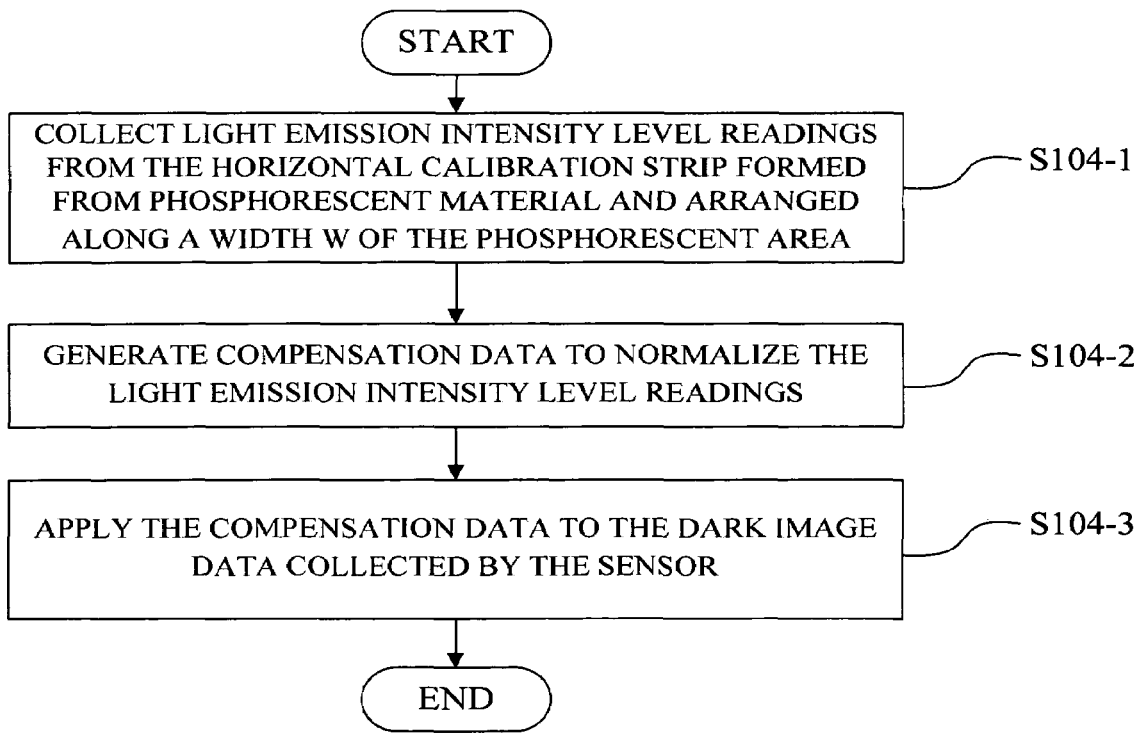
FIG. 13 is a flowchart depicting a horizontal calibration in accordance with one aspect of the present invention.

FIG. 13 is a flowchart depicting a horizontal calibration process in accordance with one aspect of the present invention, and is discussed in more detail below following the discussion of the method of FIG. 8.

At step S106, a vertical calibration is performed to compensate for changes of scanning speed of scanner head 50 in a lengthwise scan direction 86 along a length L of phosphorescent area 70.

Figure 14:
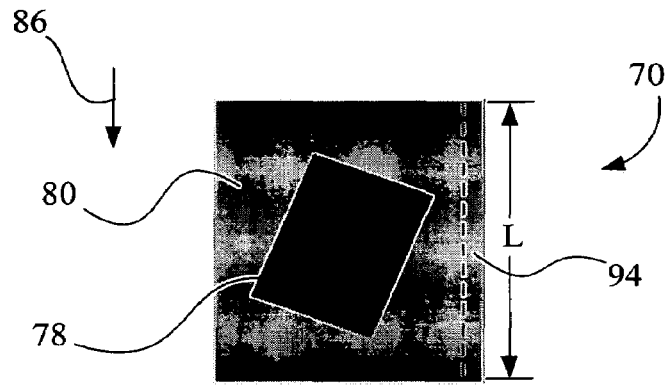
FIG. 14 is a diagrammatic depiction of a phosphorescent area including a vertical calibration strip.

For example, as illustrated in FIG. 14, due to the changes in scan speed of scanner head 50, phosphorescent area 70 of document pad 62 may be charged differently along the vertical, i.e., lengthwise, scan direction 86. For example, where scanner head 50 is slow the phosphorescent area 70 of document pad 62 is exposed more and where scan head is fast the phosphorescent area 70 of document pad 62 is exposed less. Sometimes scanner head 50 may even stop to keep up with other scanner components, such as the universal serial bus (USB), which in this case, the exposure time is even longer. In order to compensate for these fluctuations, a vertical calibration strip 94 of phosphorescent material is provided at the left side or the right side of phosphorescent area 70, and the vertical calibration is performed based on readings received from vertical calibration strip 94 by sensor 68. Alternatively, vertical calibration strip 94 may be provided separate from phosphorescent area 70.

Figure 15:
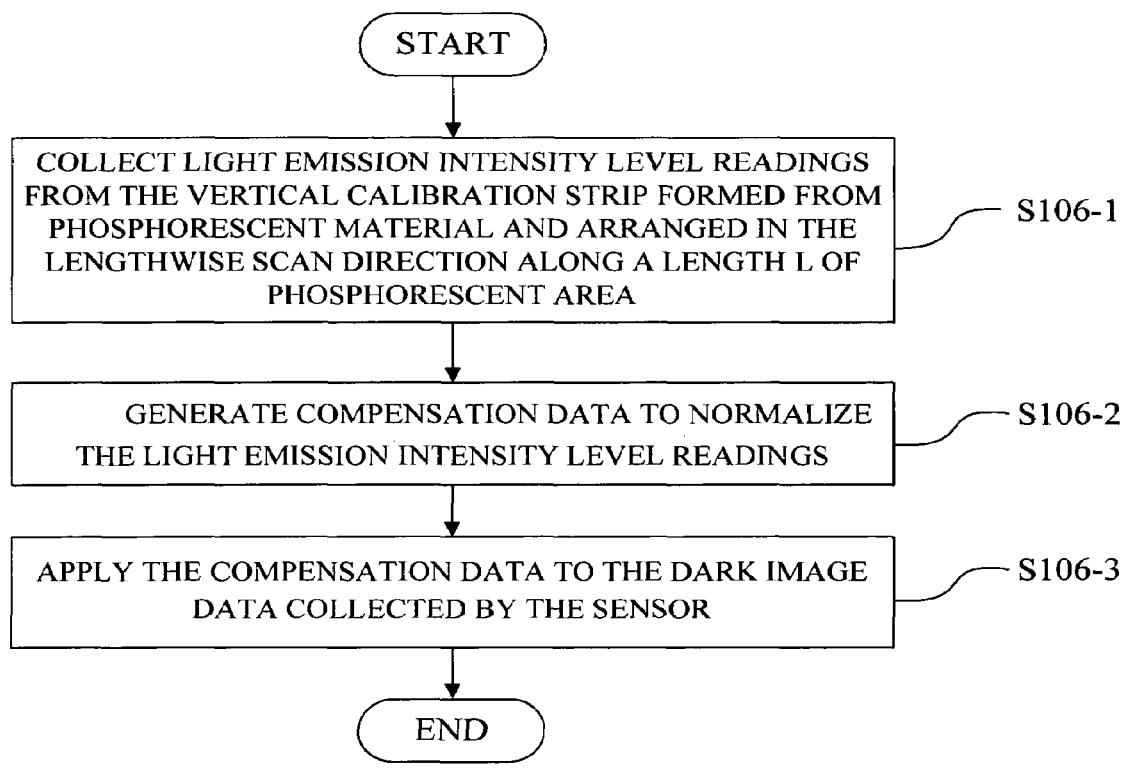
FIG. 15 is a flowchart depicting a vertical calibration in accordance with one aspect of the present invention.

FIG. 15 is a flowchart depicting a vertical calibration process in accordance with one aspect of the present invention, and is discussed in more detail below.

Each of the calibration approaches introduced above in FIG. 8 now will be individually discussed in more detail below.

FIG. 9 is a flowchart depicting the ambient light calibration introduced above at step S100 of the method of FIG. 8. Ambient light calibration is used for determining a threshold for distinguishing between background 80 and foreground 78 (see FIG. 4B) with respect to a sensed light emission of phosphorescent area 70 by sensor 68. The ambient light calibration may be performed, for example, after each scan of scanner head 50 across the phosphorescent area 70.

At step S100-1, a histogram of light emission intensity levels for phosphorescent area 70 of document pad 62 is built. As may be observed in FIGS. 3-4C, the background light emission intensity level of the phosphorescent area 70 representative of background 80 is associated with a non-attenuated, i.e., unobstructed, portion of phosphorescent area 70 and a foreground, e.g., dark image 78, corresponding to document 60, is associated with an attenuated, i.e., obstructed, portion of phosphorescent area 70.

Figure 16:
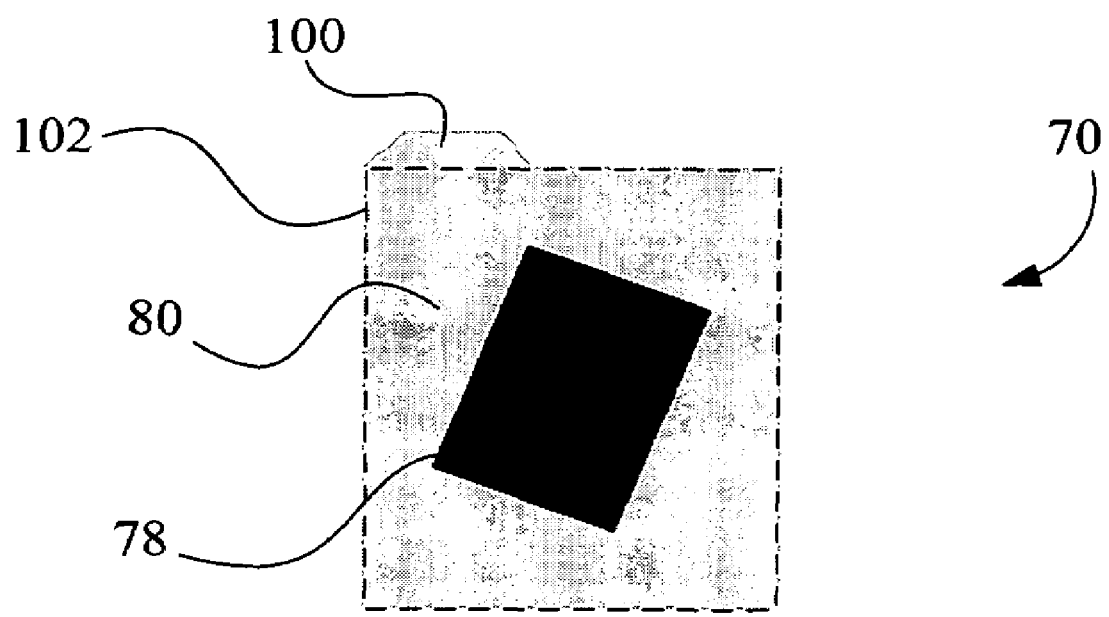
FIG. 16 is a diagrammatic depiction of a phosphorescent area including a supplemental phosphorescent area portion positioned outside the boundaries of a main phosphorescent area portion.

In the example above, it is assumed that some portion of phosphorescent area 70 of document pad 62 is not covered by document 60. However, it is possible that the entirety of phosphorescent area 70 may be covered by the document. Accordingly, in another embodiment as shown in FIG. 16, a supplemental phosphorescent area portion 100 is positioned outside the boundaries of a main phosphorescent area portion 102. The supplemental phosphorescent area portion 100, i.e., a dedicated portion, may be formed as a tab extension of main phosphorescent area portion 102. Alternatively, supplemental phosphorescent area portion 100 may be non-contiguous with main phosphorescent area portion 102.

At step S100-2, a threshold T is generated from the histogram of intensity levels of light emission of phosphorescent area 70 that is used to differentiate between a background 80 associated with the non-attenuated portion of phosphorescent area 70 and a foreground 78, e.g., dark image of document 60, associated with the attenuated portion of phosphorescent area 70. This threshold may be based, at least in part, on an intensity level associated with background 80 that is derived from the histogram. For example, an intensity level BGL that is M-percent below a top intensity level in the histogram may be selected to be representative of background 80. M-percent may be, for example, 5 percent. Thus, threshold T may be generated based simply on the background level. For example, this could be as simple as: T=BGL/2. Thus, for example, if BGL=246, then threshold T=123.

Alternatively, the threshold may be selected based on the background level BGL, and in addition, also based on an intensity level FGL that is N-percent above a lowest intensity level in the histogram, and which is selected to be representative of foreground 78. For example, N-percent may be selected to be 5 percent. Where both the background level and the foreground level are used in determining the threshold, then the threshold can be calculated as T=(FGL+BGL)/2. Thus, for example, if BGL=246 and FGL=24, then threshold T=135.

Including foreground in the equation has the advantage of making the threshold algorithm more robust against differences in document thickness. In another embodiment, for example, foreground 78 may be simulated by a foreground material separate from phosphorescent area 70.

The following is a code segment that may be used in generating the threshold T, starting from the histogram of phosphorescent area 70.

```
//Foreground level (FGL) calculation
Count = 0; //initialize count.
    L = size/20; //5% of image size
    For (FGL =255; FGL >0; FGL--) {//Count top 5% of pixels
        Count += hist [FGL];
        If (count > L) break;
    }
//Background level (BGL) calculation
Count = 0; //reset count.
For (BGL =0; BGL <256; BGL ++) {//Count bottom 5% of pixels
    Count += hist [BGL];
        If (count > L) break;
}
Threshold T= (FGL + BGL)/2.
```

In embodiments utilizing supplemental phosphorescent area portion 100 (see FIG. 16), a complete histogram of phosphorescent area 70, i.e., main phosphorescent area portion 102, of document pad 62 is not required, but rather, only a histogram of supplemental phosphorescent area portion 100 is generated. Therefore, it is possible not to wait until the end of a scan for applying background compensation in accordance with the method of ambient light calibration of FIG. 9.

FIG. 11 is a flowchart depicting the ambient light time calibration introduced above at step S102 of the method of FIG. 8.

At step S102-1, a decay constant of the phosphorescent material forming the phosphorescent area is acquired. The decay constant may be supplied, for example, by the supplier of the phosphorescent material. Alternatively, the decay constant may be determined empirically.

At step S102-2, compensation data is generated using the decay constant to correct dark image data collected by sensor 68, wherein the dark image data relates to the light emitted by the phosphorescent material at various locations on phosphorescent area 70 (see FIG. 4B).

FIG. 13 is a flowchart depicting the horizontal calibration introduced above at step S104 of the method of FIG. 8.

At step S104-1 light emission intensity level readings are collected from horizontal calibration strip 92 (see FIG. 12) formed from phosphorescent material, and arranged along a width W of phosphorescent area 70.

At step S104-2, compensation data is generated to normalize the light emission intensity level readings.

At step S104-3, the compensation data is applied to dark image data collected by sensor 68, wherein the dark image data relates to light emitted by the phosphorescent material at various locations on phosphorescent area 70.

FIG. 15 is a flowchart depicting the vertical calibration introduced above at step S106 of the method of FIG. 8.

At step S106-1, light emission intensity level readings are collected from vertical calibration strip 94 (see FIG. 14) formed from phosphorescent material, and arranged in the lengthwise scan direction 86 along a length L of phosphorescent area 70.

At step S106-2, compensation data is generated to normalize the light emission intensity level readings.

At step S106-3, the compensation data is applied to dark image data collected by sensor 68, wherein the dark image data relates to light emitted by the phosphorescent material at various locations on phosphorescent area 70.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for calibrating an imaging apparatus configured for scanning a document, said imaging apparatus including a scanner head having an illuminant and a sensor for collecting image data, and a phosphorescent material forming a phosphorescent area located opposite said scanner head, wherein said document is positioned between said scanner head and said phosphorescent area during a scanning operation, said method comprising at least one of:
performing an ambient light calibration based on a background light emission intensity level of said phosphorescent area;
performing an ambient light time calibration based on a decay constant of said phosphorescent material;
performing a horizontal calibration to compensate for irregularities in at least one of said illuminant and said sensor across a width of said phosphorescent area; and
performing a vertical calibration to compensate for changes of scanning speed of said scanner head in a lengthwise scanning direction along a length of said phosphorescent area.

2. The method of claim 1, wherein said calibrating said imaging apparatus configured for scanning said document includes at least said ambient light calibration and said ambient light time calibration.

3. The method of claim 1, wherein said calibrating said imaging apparatus configured for scanning said document includes all of said ambient light calibration, said ambient light time calibration, said horizontal calibration and said vertical calibration.

4. The method of claim 1, wherein said background light emission intensity level of said phosphorescent area is represented as a threshold that differentiates between a background associated with a non-attenuated portion of said phosphorescent area and a foreground associated with an attenuated portion of said phosphorescent area.

5. The method of claim 4, wherein said non-attenuated portion of said phosphorescent area is formed by a supplemental phosphorescent area portion positioned outside the boundaries of a main phosphorescent area portion.

6. The method of claim 5, wherein said supplemental phosphorescent area portion is formed as a tab extension of said main phosphorescent area portion.

7. The method of claim 5, wherein said supplemental phosphorescent area portion is non-contiguous with said main phosphorescent area portion.

8. The method of claim 4, wherein said attenuated portion is associated with said document.

9. The method of claim 4, wherein said foreground is simulated by a foreground material separate from said phosphorescent area.

10. The method of claim 1, wherein said ambient light calibration is performed after each scan of said scanner head across said phosphorescent area.

11. The method of claim 1, wherein said ambient light time calibration, comprises:
acquiring a decay constant of said phosphorescent material forming said phosphorescent area; and
generating compensation data using said decay constant to correct dark image data associated with said document.

12. A method for performing an ambient light calibration of an imaging apparatus configured for scanning a document, said imaging apparatus including a scanner head having an illuminant and a sensor for collecting image data, and a phosphorescent material forming a phosphorescent area located opposite said scanner head, wherein said document is positioned between said scanner head and said phosphorescent area during a scanning operation, said method comprising:
building a histogram of intensity levels of light emission of the phosphorescent area; and
generating a threshold from the histogram of intensity levels of light emission of the phosphorescent area that is used to differentiate between a background associated with a non-attenuated portion of the phosphorescent area and a foreground associated with an attenuated portion of the phosphorescent area.

13. The method of claim 12, wherein an intensity level BGL that is M-percent below a top intensity level in said histogram is selected to be representative of said background.

14. The method of claim 13, wherein M-percent equals five percent.

15. The method of claim 13, wherein said threshold is equal to said intensity level BGL divided by two.

16. The method of claim 13, wherein an intensity level FGL that is N-percent above a lowest intensity level in said histogram is selected to be representative of said foreground.

17. The method of claim 16, wherein N-percent equals five percent.

18. The method of claim 16, wherein said threshold is equal to the sum of said intensity level BGL and said intensity level FGL, divided by two.

19. The method of claim 12, wherein said non-attenuated portion of said phosphorescent area is formed by a supplemental phosphorescent area portion positioned outside the boundaries of a main phosphorescent area portion.

20. The method of claim 19, wherein said supplemental phosphorescent area portion is formed as a tab extension of said main phosphorescent area portion.

21. The method of claim 19, wherein said supplemental phosphorescent area portion is non-contiguous with said main phosphorescent area portion.

22. The method of claim 12, wherein said attenuated portion is associated with said document.

23. The method of claim 12, wherein said foreground is simulated by a foreground material separate from said phosphorescent area.

24. The method of claim 12, wherein said ambient light calibration is performed after each scan of said scanner head across said phosphorescent area.

25. A method for performing an ambient light time calibration of an imaging apparatus configured for scanning a document, said imaging apparatus including a scanner head having an illuminant and a sensor for collecting image data, and a phosphorescent material forming a phosphorescent area located opposite said scanner head, wherein said document is positioned between said scanner head and said phosphorescent area during a scanning operation, said method comprising:
  acquiring a decay constant of said phosphorescent material forming said phosphorescent area; and
  generating compensation data using said decay constant to correct dark image data collected by said sensor, said dark image data relating to light emitted by said phosphorescent material at various locations on said phosphorescent area.

26. A method for performing a horizontal calibration of an imaging apparatus configured for scanning a document, said imaging apparatus including a scanner head having an illuminant and a sensor for collecting image data, and a phosphorescent material forming a phosphorescent area located opposite said scanner head, wherein said document is positioned between said scanner head and said phosphorescent area during a scanning operation, said method comprising:
  collecting intensity level readings from a horizontal strip of said phosphorescent material arranged along a width of said phosphorescent area; and
  generating compensation data to normalize said intensity level readings.

27. The method of claim 26, further comprising applying said compensation data to dark image data collected by said sensor, said dark image data relating to light emitted by said phosphorescent material at various locations on said phosphorescent area.

28. A method for performing a vertical calibration of an imaging apparatus configured for scanning a document, said imaging apparatus including a scanner head having an illuminant and a sensor for collecting image data, and a phosphorescent material forming a phosphorescent area located opposite said scanner head, wherein said document is positioned between said scanner head and said phosphorescent area during a scanning operation, said method comprising:
  collecting intensity level readings from a vertical strip of said phosphorescent material arranged in a lengthwise scanning direction along a length of said phosphorescent area; and
  generating compensation data to normalize said intensity level readings.

29. The method of claim 28, further comprising applying said compensation data to dark image data collected by said sensor, said dark image data relating to light emitted by said phosphorescent material at various locations on said phosphorescent area.

30. An imaging apparatus configured for scanning a document, said imaging apparatus comprising:
  a scanner head having an illuminant and a sensor for collecting image data;
  a phosphorescent area formed from a phosphorescent material, and located opposite said scanner head, wherein said document is positioned between said scanner head and said phosphorescent area during a scanning operation; and
  a controller coupled to said scanner head, said controller executing program instruction for performing at least one of:
  an ambient light calibration based on a background light emission intensity level of said phosphorescent area;
  an ambient light time calibration based on a decay constant of said phosphorescent material;
  a horizontal calibration to compensate for irregularities in at least one of said illuminant and said sensor across a width of said phosphorescent area; and
  a vertical calibration to compensate for changes of scanning speed of said scanner head in a lengthwise scanning direction along a length of said phosphorescent area.

31. An imaging apparatus configured for scanning a document, said imaging apparatus comprising:
  a scanner head having an illuminant and a sensor for collecting image data;
  a phosphorescent area formed from a phosphorescent material, and located opposite said scanner head, wherein said document is positioned between said scanner head and said phosphorescent area during a scanning operation; and
  a controller coupled to said scanner head, said controller executing program instructions for performing an ambient light calibration of said imaging apparatus, including:
  building a histogram of intensity levels of light emission of the phosphorescent area; and
  generating a threshold from the histogram of intensity levels of light emission of the phosphorescent area that is used to differentiate between a background associated with a non-attenuated portion of the phosphorescent area and a foreground associated with an attenuated portion of the phosphorescent area.

32. An imaging apparatus configured for scanning a document, said imaging apparatus comprising:
  a scanner head having an illuminant and a sensor for collecting image data;
  a main phosphorescent area portion formed from a phosphorescent material, and located opposite said scanner head, wherein said document is positioned between said scanner head and said main phosphorescent area portion during a scanning operation; and
  a supplemental phosphorescent area portion formed from phosphorescent material, and positioned outside the boundaries of said main phosphorescent area portion.

33. The imaging apparatus of claim 32, wherein said supplemental phosphorescent area portion is formed as a tab extension of said main phosphorescent area portion.

34. An imaging apparatus configured for scanning a document, said imaging apparatus comprising:
  a scanner head having an illuminant and a sensor for collecting image data;
  a phosphorescent area formed from a phosphorescent material, and located opposite said scanner head, wherein said document is positioned between said scanner head and said phosphorescent area during a scanning operation; and a horizontal strip formed from phosphorescent material, and arranged along a width of said phosphorescent area.

35. The imaging apparatus of claim 34, further comprising a controller coupled to said scanner head, said controller executing program instruction for:

collecting intensity level readings from said horizontal strip of said phosphorescent material arranged along said width of said phosphorescent area; and generating compensation data to normalize said intensity level readings.

36. The imaging apparatus of claim 35, said controller executing program instructions for applying said compensation data to dark image data collected by said sensor, said dark image data relating to light emitted by said phosphorescent material at various locations on said phosphorescent area.

37. An imaging apparatus configured for scanning a document, said imaging apparatus comprising:

a scanner head having an illuminant and a sensor for collecting image data;

a phosphorescent area formed from a phosphorescent material, and located opposite said scanner head, wherein said document is positioned between said scanner head and said phosphorescent area during a scanning operation; and a vertical strip formed from phosphorescent material, and arranged in a lengthwise scanning direction along a length of said phosphorescent area.

38. The imaging apparatus of claim 37, further comprising a controller coupled to said scanner head, said controller executing program instructions for:

collecting intensity level readings from said vertical strip of said phosphorescent material arranged in said lengthwise scanning direction along said length of said phosphorescent area; and generating compensation data to normalize said intensity level readings.

39. The imaging apparatus of claim 38, said controller executing program instructions for applying said compensation data to dark image data collected by said sensor, said dark image data relating to light emitted by said phosphorescent material at various locations on said phosphorescent area.

* * * * *